(12) United States Patent
Matsuoka et al.

(10) Patent No.: US 8,316,200 B2
(45) Date of Patent: Nov. 20, 2012

(54) MICROCOMPUTER, ELECTRONIC INSTRUMENT, AND FLASH MEMORY PROTECTION METHOD

(75) Inventors: Hiroki Matsuoka, Fujimi (JP); Keisuke Hashimoto, Fujimi (JP)

(73) Assignee: Seiko Epson Corporation (JP)

( * ) Notice: Subject to any disclaimer, the term of this patent is extended or adjusted under 35 U.S.C. 154(b) by 1147 days.

(21) Appl. No.: 12/099,988

(22) Filed: Apr. 9, 2008

(65) Prior Publication Data

US 2008/0256288 A1 Oct. 16, 2008

(30) Foreign Application Priority Data

Apr. 10, 2007 (JP) ................................ 2007-103063

(51) Int. Cl.
*G06F 12/14* (2006.01)
*G06F 13/14* (2006.01)
(52) U.S. Cl. ..................... 711/163; 711/103; 710/309
(58) Field of Classification Search .................... 711/163
See application file for complete search history.

(56) References Cited

U.S. PATENT DOCUMENTS

| | | | | |
|---|---|---|---|---|
| 4,590,552 A | * | 5/1986 | Guttag et al. | 711/163 |
| 5,822,784 A | * | 10/1998 | Garney | 711/208 |
| 5,960,172 A | * | 9/1999 | Hwang | 726/34 |
| 6,516,378 B1 | * | 2/2003 | Yamashita et al. | 710/306 |
| 6,885,607 B2 | | 4/2005 | Ozawa | |
| 6,976,136 B2 | * | 12/2005 | Falik et al. | 711/152 |
| 2003/0149851 A1 | * | 8/2003 | Shiota et al. | 711/163 |
| 2006/0036808 A1 | * | 2/2006 | Intrater et al. | 711/123 |
| 2009/0083858 A1 | * | 3/2009 | Jennings et al. | 726/27 |

FOREIGN PATENT DOCUMENTS

| | | |
|---|---|---|
| JP | 59-005496 | 1/1984 |
| JP | 09-114743 | 5/1997 |
| JP | 2002-269065 | 9/2002 |
| JP | 2004-288257 | 10/2004 |

* cited by examiner

*Primary Examiner* — Kaushikkumar Patel

(74) *Attorney, Agent, or Firm* — Harness, Dickey & Pierce, P.L.C.

(57) ABSTRACT

A microcomputer includes a flash memory and a flash controller that controls access to the flash memory, the flash memory including a protection information storage section that stores protection information, the protection information indicating whether or not access to a given area of the flash memory is available; the flash controller including a flash protection section that performs a protection process relating to access to a given area of the flash memory based on the protection information; and the flash protection section performing the protection process relating to access to the flash memory when an access target is data.

17 Claims, 12 Drawing Sheets

| address | bit | SECTOR | INITIAL VALUE | R/W |
|---|---|---|---|---|
| 0x17ffc | RD15-D4 | - | - | - |
| | RD3 | 4~7 | 1 | R/W |
| | RD2 | 0~3 | 1 | R/W |
| | RD1 | 12~15 | 1 | R/W |
| | RD0 | 8~11 | 1 | R/W |
| 0x17ffe | LD15-D4 | - | - | - |
| | LD3 | 4~7 | 1 | R/W |
| | LD2 | 0~3 | 1 | R/W |
| | LD1 | 12~15 | 1 | R/W |
| | LD0 | 8~11 | 1 | R/W |

1: NOT WRITE-PROTECTED
0: WRITE-PROTECTED

1: NOT READ-PROTECTED
0: READ-PROTECTED

MICROCOMPUTER, ELECTRONIC INSTRUMENT, AND FLASH MEMORY PROTECTION METHOD

Japanese Patent Application No. 2007-103063, filed on Apr. 10, 2007, is hereby incorporated by reference in its entirety.

BACKGROUND OF THE INVENTION

The present invention relates to a microcomputer, an electronic instrument, and a protection method for a flash memory provided in a microcomputer.

A protection control method using a flash writer is known for a microcomputer including a flash memory. On the other hand, a microcomputer including a flash memory generally does not have a protection function (see JP-A-59-5496 and JP-A-2002-269065).

Since related-art technology requires a protection cancellation key or a complicated protection circuit, or suffers from security holes, it is difficult to provide the entire flash memory with read protection.

SUMMARY

According to a first aspect of the invention, there is provided a microcomputer comprising:

a flash memory; and a flash controller that controls access to the flash memory, the flash memory including a protection information storage section that stores protection information, the protection information indicating whether or not access to a given area of the flash memory is available;

the flash controller including a flash protection section that performs a protection process relating to access to a given area of the flash memory based on the protection information; and the flash protection section performing the protection process relating to access to the flash memory when an access target is data.

According to a second aspect of the invention, there is provided an electronic instrument comprising:

the above-described microcomputer;

a receiving section that receives input information; and an output section that outputs a processing result of the microcomputer based on the input information.

According to a third aspect of the invention, there is provided a protection method for a flash memory provided in a microcomputer, the method comprising:

a protection information setting step of providing a protection information storage section in the flash memory, the protection information storage section storing protection information that indicates whether or not access to a given area of the flash memory is available; and a flash protection step of performing a protection process relating to access to the flash memory when an access target is data and access to a given area of the flash memory is performed based on the protection information.

DETAILED DESCRIPTION OF THE EMBODIMENT

Figure 1:
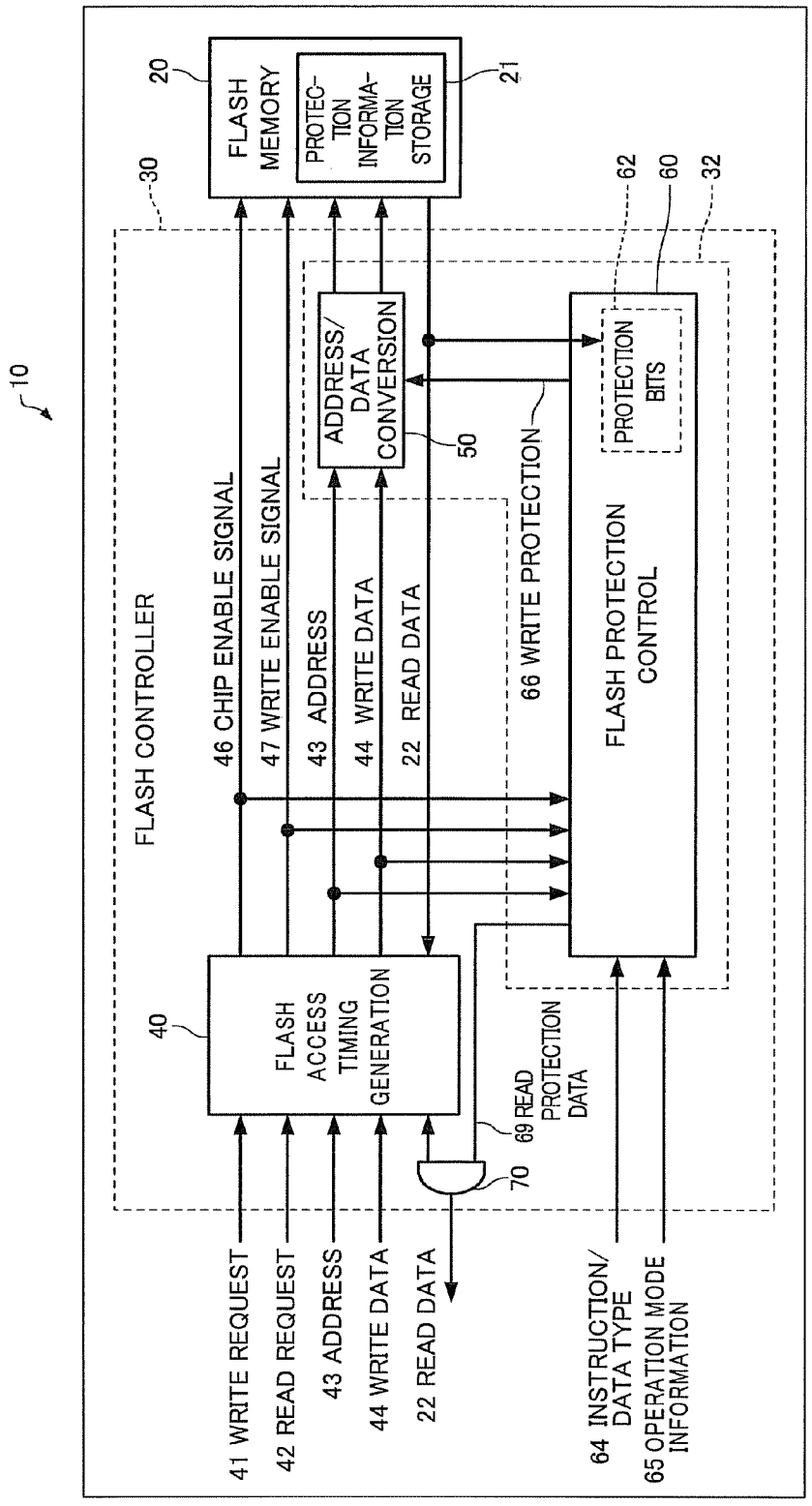
FIG. 1 is a diagram illustrative of the configuration of a microcomputer according to one embodiment of the invention.

The invention may provide a microcomputer, an electronic instrument, and a protection method for a flash memory provided in a microcomputer. They enable reliable read protection with a simple circuit configuration.

(1) According to one embodiment of the invention, there is provided a microcomputer comprising:

a flash memory; and a flash controller that controls access to the flash memory, the flash memory including a protection information storage section that stores protection information, the protection information indicating whether or not access to a given area of the flash memory is available;

the flash controller including a flash protection section that performs a protection process relating to access to a given area of the flash memory based on the protection information; and the flash protection section performing the protection process relating to access to the flash memory when an access target is data.

The flash memory is a nonvolatile semiconductor memory which is rewritable (data can be erased and written) and of which the stored information is retained after power has been removed. The flash memory is also referred to as a flash EEPROM or a flash ROM.

Whether or not the access target is data may be determined based on information from a CPU or an arbiter (when using a Harvard architecture).

The flash memory may be divided into a plurality of areas, and the protection information (e.g., the presence or absence of protection, the presence or absence of write protection, and the presence or absence of read protection) may be set in area units.

At least one of a write protection process and a read protection process is performed as the access protection process. The read protection process may be implemented by replacing read data returned to a CPU by a specific value (e.g., 0x0000), for example. The write protection process may be implemented by converting a write address into a specific address (e.g., address where a protection bit is stored), and converting write data into a specific value (e.g., information stored in the protection bit) (i.e., the address and the data are replaced by another address and another piece of data), for example.

According to this embodiment, the entirety or part of the flash memory can be provided with read protection (i.e., can be protected from being read).

The flash protection section may not perform the protection process relating to access to the flash memory when the access target is an instruction. For example, when a CPU has accessed to read an instruction, the flash protection control section may not provide protection even if the access address is a protection target address. This enables a program to be executed while preventing the program from being read as data.

(2) In this microcomputer, the protection information storage section may store protection presence information that indicates the presence or absence of at least one of read protection and write protection corresponding to each of a plurality of areas set in the flash memory; and the flash protection section may perform the protection process based on the protection presence information corresponding to an area to which an address specified by an access request belongs.

The plurality of areas may be allocated by dividing the flash memory so that the areas overlap or do not overlap. The plurality of areas may have an identical size and shape, or may differ in size and shape.

The protection presence information may be provided by providing a protection bit corresponding to each area, or providing a protection bit corresponding to each area and read/write protection.

According to this embodiment, the presence or absence of protection can be controlled in area units.

(3) This microcomputer may further comprise:

an initialization section that reads information stored in the protection information storage section of the flash memory during a boot process, and stores the read information in a protection bit register, wherein the flash protection section may perform the protection process referring to protection information stored in the protection bit register.

The protection bit register may be a dedicated register provided in the flash protection section, or may be a general register. For example, the protection bit register may be an internal register using a flip-flop (FF). According to this embodiment, the information stored in the protection information is copied onto the internal register during a boot process (when power is supplied), and the process is performed referring to the internal register. Therefore, the process can be simplified and performed at high speed as compared with the case of referring to the flash memory.

(4) In this microcomputer, the flash protection section may perform the protection process only when an access request for the flash memory is a read request.

This makes it possible to protect the flash memory not to be read externally.

(5) In this microcomputer, the flash protection section may perform the protection process when a processing mode of a CPU is a debug mode.

The flash protection section may determine whether or not the processing mode of the CPU is a debug mode or a normal mode based on mode information received from the CPU.

The term "debug mode" refers to a case where the CPU is in a debug state which means a state other than the user mode and a running state. The debug state may be referred to as a break mode or a test mode, for example.

In the debug mode, a program other than a predetermined user program may operate or a program with a bug may operate, whereby information stored in the flash memory may be read or erroneously erased. According to this embodiment, such a situation can be prevented by performing the protection process in the debug mode.

(6) In this microcomputer, when an access request for the flash memory is an erase request command for a predetermined block unit, the flash protection section may prohibit execution of the erase request command.

The erase request is a request for destroying stored data so that the stored data cannot be read. The specific block may be a sector, for example. The erase request command for a specific block unit is a sector erasure command, for example. The protection process may be performed regardless of the presence or absence of protection indicated by the protection information, or may be performed only when a protection bit is set corresponding to the sector.

Execution of the command may be prohibited by replacing a value of a data signal transmitted to the flash memory by another value to change the command into an invalid command.

According to this embodiment, the sector erasure process is performed during debugging so that only the sector including the protection bits is erased (protection is canceled), whereby information stored in the remaining sectors can be prevented from being read.

(7) In this microcomputer, the flash protection section may not perform the protection process when an access request for the flash memory is an erase request command for the entire flash memory.

In this case, the erase request command is a request for destroying data stored in the entire flash memory so that the stored data cannot be read. Since the information which must be protected is also erased when the chip erasure process is executed, it is impossible to read the protection target information by canceling the protection bit. Therefore, a microcomputer can be provided which enables the erase request command which erases the entire flash memory and improves convenience to the user.

(8) In this microcomputer, the flash memory may be configured so that data can be written into the flash memory after erasing a predetermined block unit in advance; and the flash protection section may perform the protection process when a value stored in the protection information storage section of the flash memory differs from an initial value of a memory cell after erasure.

Although the flash memory is one type of EEPROM, data cannot be written in one byte unit, differing from a known EEPROM. When the flash memory is a type in which data is written after erasing data in block units, or a NAND flash memory (which is suitable for an increase in the degree of integration and enables high-speed writing, but cannot allow one byte unit writing), provided that the initial value of the flash memory is a first value (e.g., "1"), when a second value (e.g., "0") has been written into a memory cell, the value of that memory cell cannot be set at the first value as long as that memory cell is erased.

Therefore, when the second value (e.g., "0") is set in a bit which indicates that protection is provided, the second value is not overwritten. Accordingly, protection cannot be canceled externally.

According to this embodiment, a highly reliable (secure) microcomputer can be provided which makes it difficult to externally cancel protection.

(9) This microcomputer may further comprise:

an arbiter which is connected to a plurality of buses including a data bus and an instruction bus, when the buses compete for access to the flash memory, the arbiter arbitrating between the buses and allowing one of the buses to access the flash memory, the arbiter generating bus identification information that identifies whether the allowed bus is the data bus or the instruction bus, and transmitting the bus identification information to the flash protection section; and the flash protection section determining whether or not the access target is data based on the bus identification information.

(10) According to one embodiment of the invention, there is provided an electronic instrument comprising:

the above-described microcomputer;

a receiving section that receives input information; and an output section that outputs a processing result of the microcomputer based on the input information.

(11) According to one embodiment of the invention, there is provided a protection method for a flash memory provided in a microcomputer, the method comprising:

a protection information setting step of providing a protection information storage section in the flash memory, the protection information storage section storing protection information that indicates whether or not access to a given area of the flash memory is available; and a flash protection step of performing a protection process relating to access to the flash memory when an access target is data and access to a given area of the flash memory is performed based on the protection information.

Some embodiments of the invention will be described in detail below, with reference to the drawings. Note that the embodiments described below do not in any way limit the scope of the invention laid out in the claims herein. In addition, not all of the elements of the embodiments described below should be taken as essential requirements of the invention.

1. Microcomputer

FIG. 1 is a diagram illustrative of the configuration of a microcomputer according to one embodiment of the invention.

A microcomputer 10 according to this embodiment includes a flash memory 20. The flash memory 20 includes a protection information storage section 21 which stores protection information which indicates the availability of access to a given area of the flash memory 20.

The microcomputer 10 according to this embodiment includes a flash controller 30 which controls access to the flash memory 20. The flash controller 30 includes a flash protection control section 60, an address/data conversion section 50, a flash access timing generation section 40, and a selection section 70. The flash protection control section 60 and the address/data conversion section 50 function as a flash protection section 32 which performs a protection process relating to access to a given area of the flash memory 20 based on the protection information. The flash protection section 32 performs the protection process relating to access to the flash memory when the access target is data.

The protection information storage section 21 stores protection presence information which indicates the presence or absence of at least one of read protection and write protection corresponding to each of a plurality of areas set in the flash memory 20. The flash controller 30 may perform the protection process based on the protection presence information corresponding to an area to which an address specified by an access request belongs.

A CPU (not shown) or the protection information storage section 21 of the microcomputer may function as an initialization section which reads information stored in the protection information storage section of the flash memory 20 during a boot process and stores the read information in a protection bit register 62.

The flash protection section 32 performs the protection process referring to the protection information stored in the protection bit register 62.

The flash protection section 32 may perform the protection process only when the access request for the flash memory 20 is a read request.

The flash protection section 32 may perform the protection process when a processing mode of the CPU is a debug mode.

When the access request for the flash memory 20 is an erase request command for a specific block unit, the flash protection section 32 may prohibit execution of the command.

When the access request for the flash memory is an erase request command for the entire flash memory, the flash protection section 32 may not perform the protection process.

The flash memory 20 is configured so that data can be written into the flash memory 20 after erasing a specific block unit. The flash protection section 32 may perform the protection process when a value stored in the protection information storage section 21 of the flash memory 20 differs from an initial value of a memory cell after erasure.

The flash access timing generation section 40 receives a write request signal 41, a read request signal 42, an address 43, and write data 44, generates a chip enable signal 46 and a write enable signal 47 based on the write request signal 41 and the read request signal 42, and outputs the generated chip enable signal 46, the generated write enable signal 47, the address 43, and the write data 44 at a flash memory access timing. The flash access timing generation section 40 outputs read data 22 read from the flash memory 20 at a specific timing.

The flash protection control section 60 receives an instruction/data type 64 which indicates whether the access target is an instruction or data, operation mode information 65, the chip enable signal 46, the write enable signal 47, the address 43, and the write data 44 output from the flash access timing generation section 40, and the read data 22 read from the flash memory, and determines whether or not the access is the protection target based on the chip enable signal 46, the write enable signal 47, the address 43, and a protection bit 62. When the flash protection control section 60 has determined that the access is the protection target, the flash protection control section 60 outputs write protection information 66 and read protection information.

The address/data conversion section 50 converts an address and data written into the flash memory when write protection is provided based on the write protection information.

The read data 22 read from the flash memory 20 without protection and dummy read data output when read protection is provided are input to the selection section 70. The selection section 70 selectively outputs the read data 22 or the dummy read data corresponding to the presence or absence of protection.

Figure 2A:
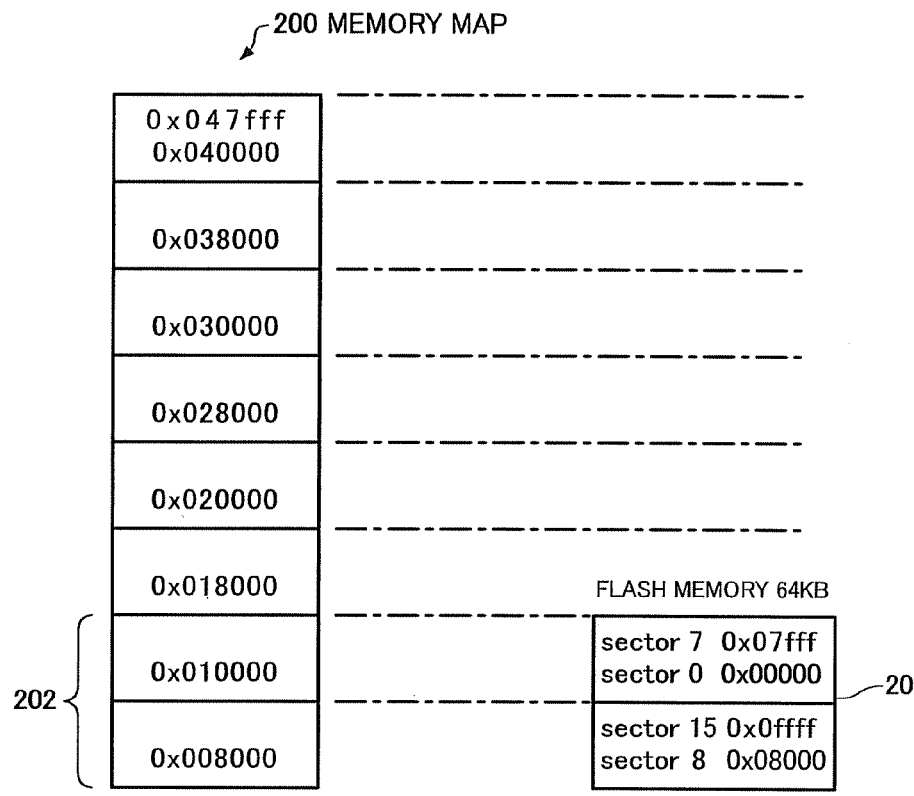
FIGS. 2A and 2B are diagrams illustrative of allocation of a flash memory.
Figure 2B:
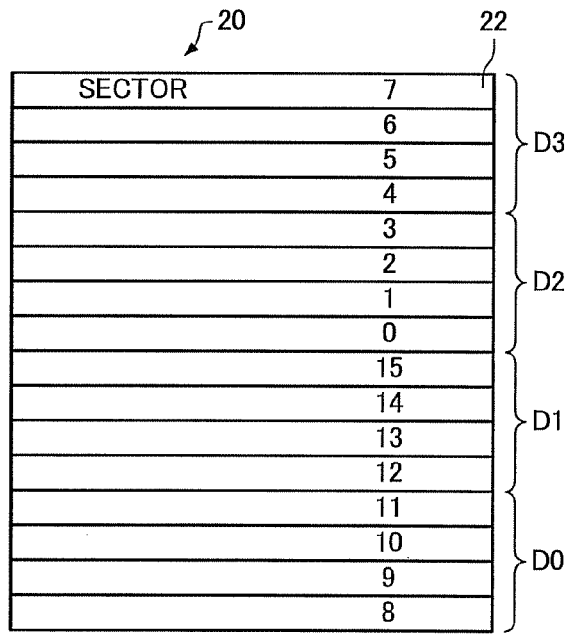

FIGS. 2A and 2B are diagrams illustrative of allocation of the flash memory. FIG. 2A shows a memory map 200 according to this embodiment. In this embodiment, the flash memory 20 with a capacity of 64 KB is allocated to a portion (0x08000 to 007fff) of logical addresses 202. The flash memory 20 is divided into sixteen sectors (sectors 0 to 15) (16 KB sectors are set in FIG. 2A). The flash memory 20 can be erased in sector units when a sector erasure command is executed.

In this embodiment, the protection information storage section 21 is provided in a specific area of the flash memory 200, and stores the protection information. As shown in FIG. 2B, the last 32 bits of a specific sector (sector 7 in FIG. 2B) of the flash memory may be system-reserved as the protection bits (protection information storage section) 21, for example.

Figures 3A, 3B:
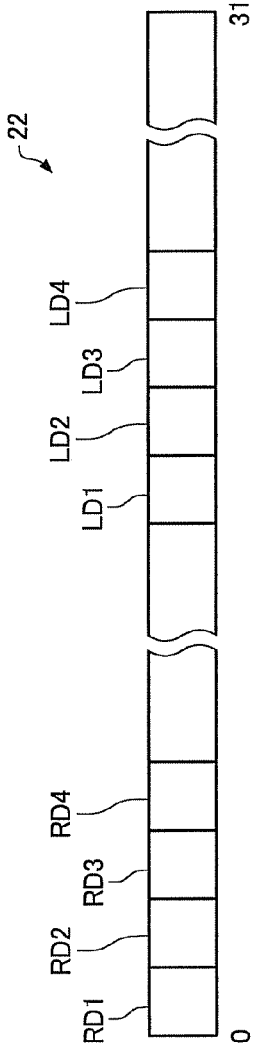
FIGS. 3A and 3B are diagrams illustrative of protection bits.

FIGS. 3A and 3B are diagrams illustrative of the protection bits.

In this embodiment, write protection and read protection can be designated in specific area units (16 KB units or four sector units in this example) of the flash memory 200. As shown in FIGS. 3A and 3B, 32 protection bits may be set, for example. Bits RD0, RD1, RD2, and RD3 may be set to indicate the presence or absence of write protection corresponding to the sectors 8 to 11, 12 to 15, 0 to 3, and 4 to 7, respectively. The absence of write protection may be indicated by "1", and the presence of write protection may be indicated by "0". Likewise, bits LD0, LD1, LD2, and LD3 may be set to indicate the presence or absence of read protection corresponding to the sectors 8 to 11, 12 to 15, 0 to 3, and 4 to 7, respectively. The absence of read protection may be indicated by "1", and the presence of write protection may be indicated by "0". Writing of data into the designated area is prohibited when write protection is provided, and writing of data into the designated area is prohibited when read protection is provided.

The initial value (not protected) of the write or read protection bit is "1". "0" is written into the write or read protection when providing protection. The flash memory 20 according to this embodiment is configured so that data can be written into the flash memory 20 after erasing a specific block unit. After data has been written, the data cannot be rewritten in memory cell units. Therefore, if the value written into the memory cell after erasure coincides with the initial value (not protected) ("1" in this example) of the protection bit, when protection has been provided using one bit (i.e., "0" has been written into one bit), it is impossible to overwrite only that bit by "1" (not protected). Therefore, the protection bit cannot be rewritten to cancel protection.

In this embodiment, even if a sector erasure command has been issued, a sector erasure process is not executed in the debug mode. Therefore, a situation in which the sector including the protection bits (protection information storage section) is erased in the debug mode so that the protection bits are initialized (not protected) can be prevented.

In this embodiment, a chip erasure process (erasure of the entire flash memory) can be executed in the debug mode. Specifically, since the protection target information is also erased when the chip erasure process is executed, it is impossible to read the protection target information by canceling the protection bit. On the other hand, since the sector erasure process causes only the sector including the protection bits to be erased (protection to be canceled) without erasing the remaining sectors, information stored in the remaining sectors may be read. Therefore, execution of the sector erasure process is prohibited in the debug mode. In this case, execution of the sector erasure process may be completely prohibited in the debug mode, or erasure of the target sector may be prohibited in the debug mode when the protection bit corresponding to the target sector indicates that protection is provided. In the former case, protection is not canceled even if the protection bit corresponding to a specific area (unit area in which the protection bits are set) including the sector containing the protection bits is set at "0" (i.e., protected). In the latter case, it is necessary to prevent protection from being erased (canceled) by setting the protection bit corresponding to a specific area (unit area in which the protection bits are set) including the sector containing the protection bits at "0" (i.e., protected).

Figure 4:
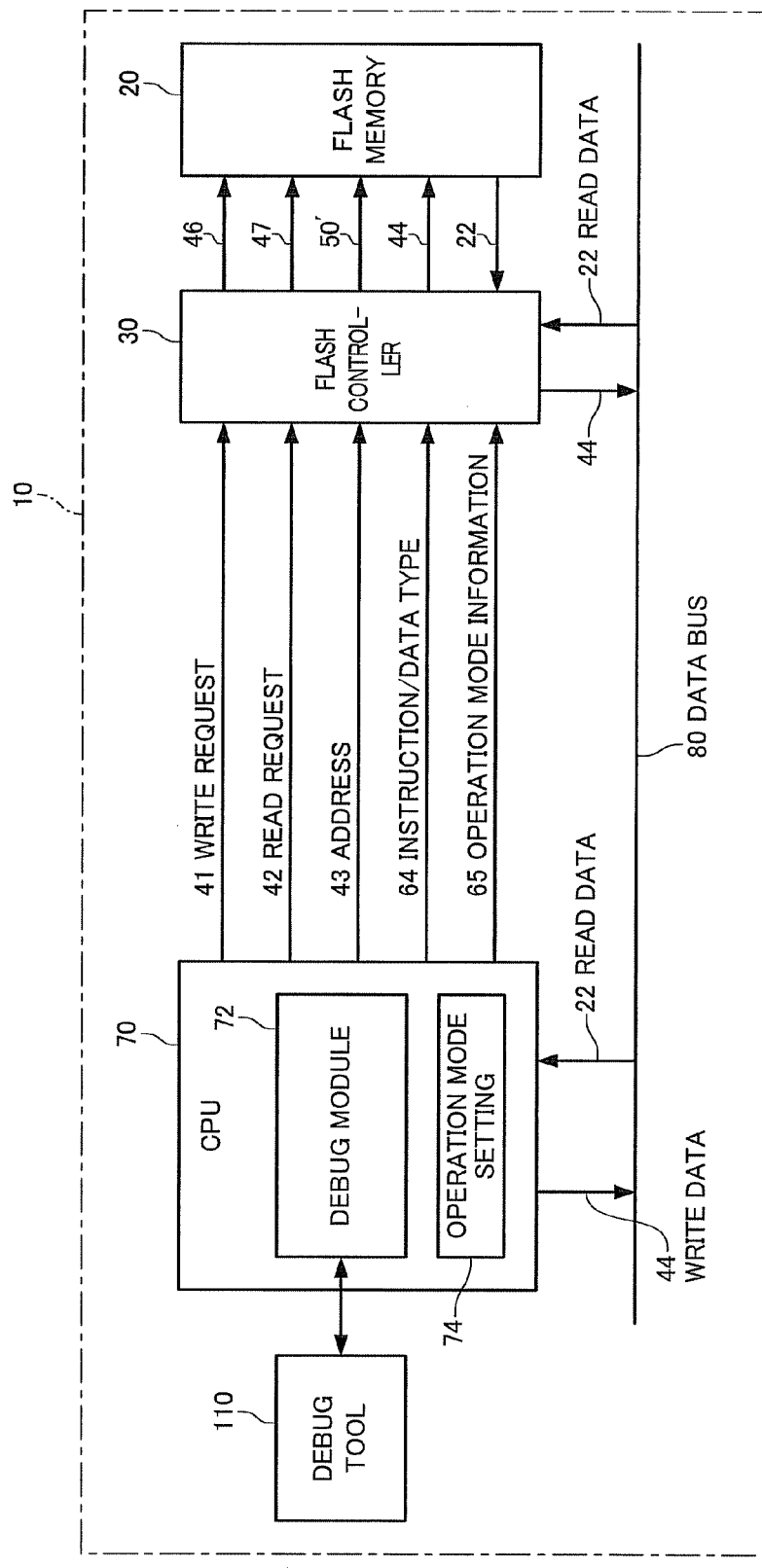
FIG. 4 is a diagram showing the configuration of a microcomputer using an identical bus for instructions and data.

FIG. 4 shows the configuration of a microcomputer using an identical bus for instructions and data. FIG. 4 shows a configuration in which a CPU 70 and a data bus 80 are added to the main portion shown in FIG. 1.

The CPU 70 executes various instructions, and includes a debug module 72. The debug module 72 includes a debug circuit for on-chip debugging. The debug module 72 exchanges debug information with an external debug tool 110 in the debug mode, and performs various debug processes by executing a debug program.

The CPU 70 has a user mode and a debug mode, and includes an operation mode setting section 74. The operation mode setting section 74 includes an operation mode register (FF) (not shown). The operation mode setting section 74 sets the debug mode based on a forced break, a break point, a break in each step of step execution, or the like.

The term "debug mode" refers to a mode in which the CPU is in a debug state which means a state other than the user mode and a running state. The debug state may be referred to as a break mode or a test mode, for example.

The configurations of the flash controller 30 and the flash memory 20 are the same as those shown in FIG. 1. The flash controller 30 receives the write request 41, the read request 42, the address 43, the instruction/data type 64, and the operation mode information 65 from the CPU through dedicated signal lines. The input/output signal lines of the write data 44 and the read data 22 are connected to the general-purpose data bus 80. The write data 44 and the read data 22 are exchanged through the data bus 80.

Figure 5:
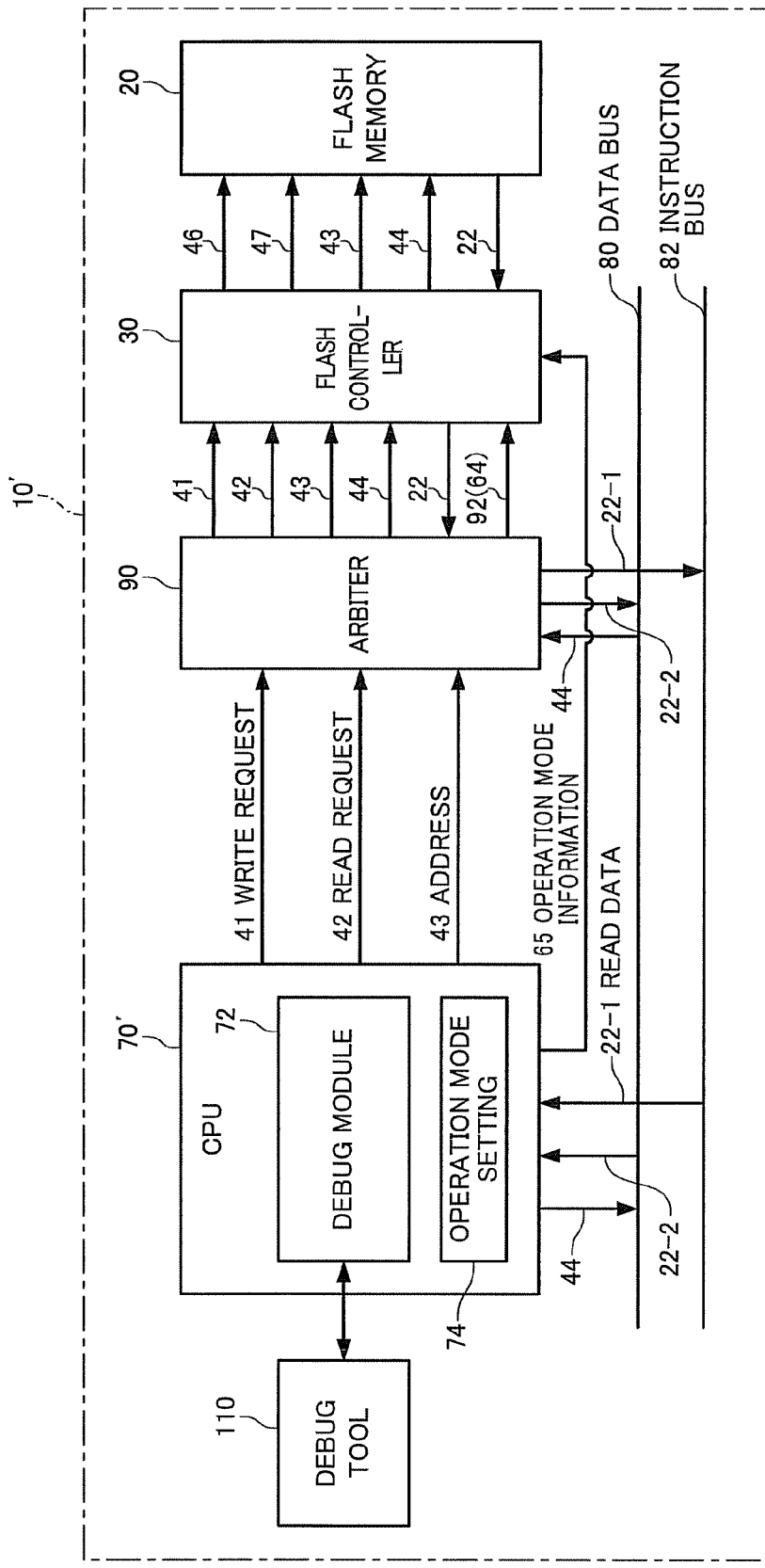
FIG. 5 is a diagram showing the configuration of a microcomputer having a Harvard architecture.

FIG. 5 shows the configuration of a microcomputer having a Harvard architecture (i.e., an instruction bus and a data bus are separately provided). FIG. 5 shows a configuration in which a CPU 70', an arbiter 90, the data bus 80, and an instruction bus 82 are added to the main portion shown in FIG. 1.

The Harvard architecture refers to an architecture in which an instruction communication path and a data communication path are separately provided. A computer having a Harvard architecture can simultaneously read an instruction and data from a memory.

The arbiter 90 is connected to the data bus 80 and the instruction bus 82, and arbitrates between the access rights of the data bus 80 and the instruction bus 82 with respect to the flash memory 20. The arbiter 90 is connected to a plurality of buses including the data bus 80 and the instruction bus 82. When a plurality of buses compete for access to the flash memory 20, the arbiter 90 arbitrates between the accesses and allows one of the buses to access the flash memory 20. The arbiter 90 generates bus identification information 92 (i.e., instruction/data type 64) which specifies whether the bus which has been allowed to access the flash memory 20 is the data bus 80 or the instruction bus 82, and transmits the bus identification information 92 to the flash controller 30. The flash controller 30 determines whether or not the access target is data based on the bus identification information 92 (64).

The configurations of the flash controller 30 and the flash memory 20 are the same as those shown in FIG. 1. The arbiter 90 receives the write request 41, the read request 42, and the address 43 from the CPU 70' through dedicated signal lines, and transmits the received write request 41, read request 42, and address 43 to the flash controller 30 through dedicated signal lines. The CPU 70' receives read data 22-1 (in the case of an instruction) from the arbiter 90 through the instruction bus 82, receives read data 22-2 (in the case of data) from the arbiter 90 through the data bus 82, and transmits the write data 44 (handled as data irrespective of whether the write data 44 contains an instruction or data) to the arbiter 90 through the data bus 80.

The operation mode 65 is transmitted from the CPU 70' to the flash controller 30 through a dedicated signal line.

Figure 6:
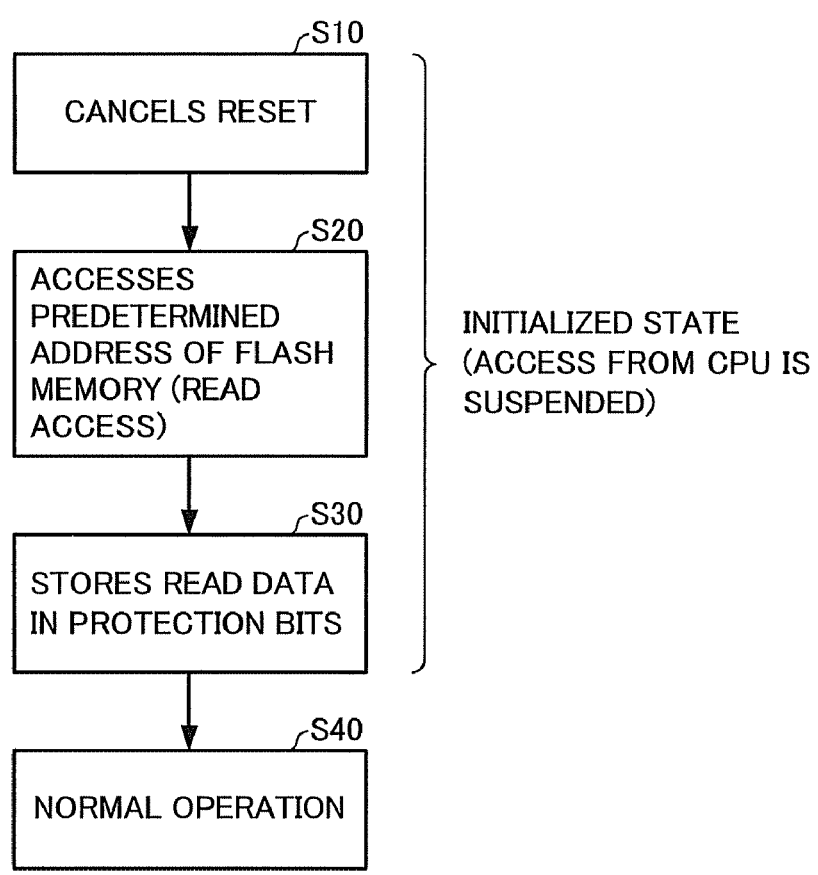
FIG. 6 is a flowchart showing the flow of an initialization process according to one embodiment of the invention.

FIG. 6 is a flowchart showing the flow of an initialization process according to this embodiment.

A reset is canceled (step S10). A specific address of the flash memory 20 (address of the protection information storage section) is accessed (read access) (step S20). The read data (protection information) is stored in the protection bits 62 (step S30). The steps S10 to S30 make up the initialization process. Access from the CPU is suspended during the initialization process.

In this embodiment, the information stored in the protection information storage section 21 of the flash memory 20 is read during the boot process and is stored in the protection bits (boot information storage register (e.g., flip-flop (FF)) 62, as described above. The flash protection control section 60 performs the protection process based on the protection bits 62.

Figure 7:
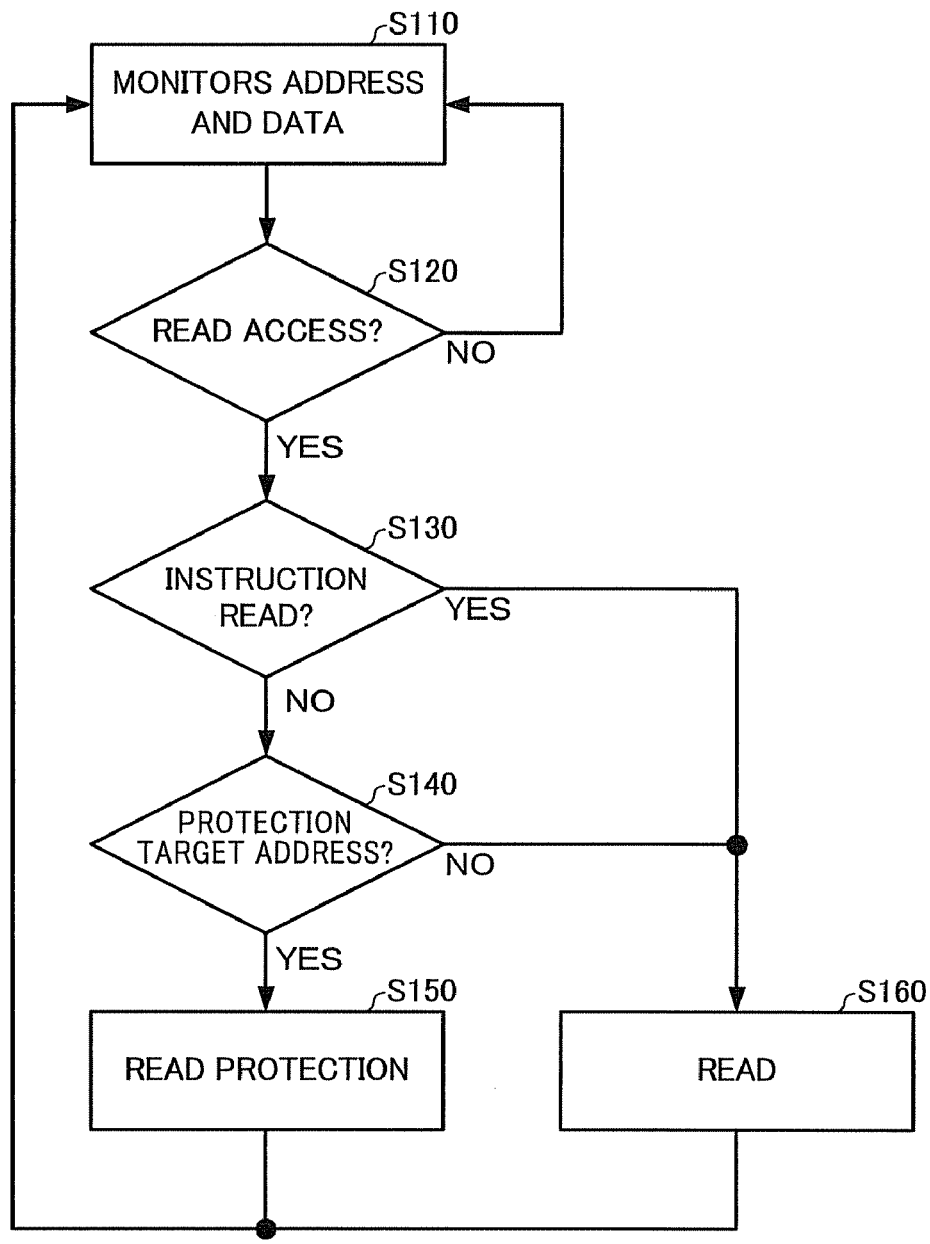
FIG. 7 is a flowchart showing the flow of a read protection process according to one embodiment of the invention.

FIG. 7 is a flowchart showing the flow of a read protection process according to this embodiment.

The flash protection control section monitors the access address and data relating to the flash memory 20 during the normal operation (step S110). For example, the flash protection control section may monitor the address 43, the write data 44, the chip enable signal 46, and the write enable signal 47 output from the flash access timing generation section, as shown in FIG. 1.

When a read access has occurred, the flash protection control section 60 determines whether or not the read access is an instruction read access (steps S120 and S130). The flash protection control section 60 determines whether or not a read access has occurred based on the chip enable signal 46 and the write enable signal 47 output from the flash access timing generation section 40. For example, the flash protection control section 60 may determine that a read access has occurred when the chip enable signal 46 and the write enable signal 47 respectively indicate a chip-enabled state and a write-disabled state. The flash protection control section 60 may determine whether or not the read access is an instruction read access based on whether or not the instruction/data type 64 received from the CPU or the arbiter 90 indicates an instruction.

When the read access is an instruction read access, the target instruction is read from the flash memory 20 (steps S120 and S130). In this embodiment, when the CPU has accessed to read an instruction, the flash protection control section 60 does not provide protection even if the access address is a protection target address. This enables a program to be executed while preventing the program from being read as data.

When the read access is not an instruction read access (i.e., when a data read access has occurred), the flash protection control section 60 determines whether or not the access address is a protection target address (step S140). For example, when the read protection bit set corresponding to the sector including the address output from the flash access timing controller 40 is '0', the flash protection control section 60 may determine that the access address is a read protection target address.

When the access address is a read protection target address, the flash protection control section 60 performs the read protection process (step S150). The read protection process may be implemented by replacing the read data returned to the CPU by 0x0000, for example. Specifically, the flash protection control section 60 may output 0x0000CPU as read protection data returned to the CPU during the read protection process, for example. The selection section 70 may selectively output the read protection data from the read data read from the flash memory and the read protection data input to the selection section 70.

When the access address is not a protection target address, the target data is read from the flash memory 20 (step S160).

Figure 8:
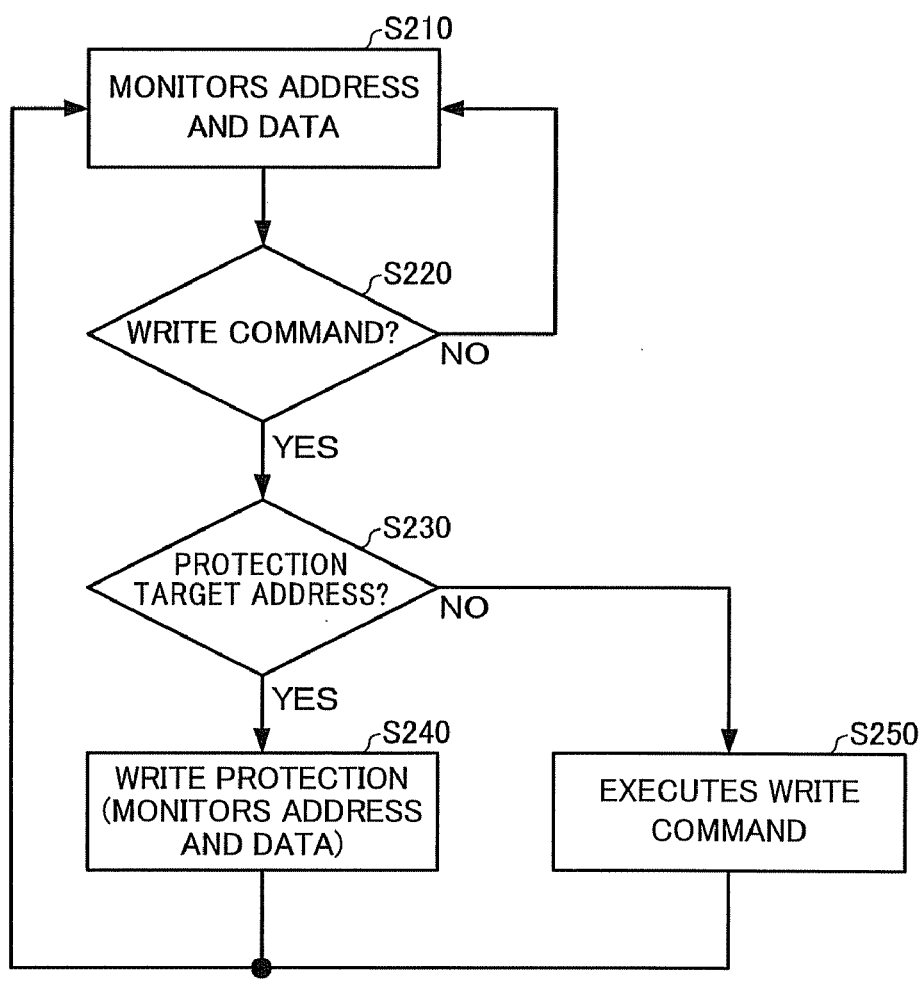
FIG. 8 is a flowchart showing the flow of a write protection process according to one embodiment of the invention.

FIG. 8 is a flowchart showing the flow of a write protection process according to this embodiment.

The flash protection control section 60 monitors the access address and data relating to the flash memory during normal operation (step S210). For example, the flash protection control section 60 may monitor the address 43, the write data 44, the chip enable signal 46, and the write enable signal 47 output from the flash access timing generation section, as shown in FIG. 1.

When the flash protection control section 60 has detected a write command, the flash protection control section 60 determines whether or not the access address is a protection target address (steps S220 and S230). The flash protection control section 60 determines whether or not read access has occurred based on the chip enable signal 46 and the write enable signal 47 output from the flash access timing generation section 40. For example, the flash protection control section 60 may determine that the write command has been detected when the chip enable signal 46 and the write enable signal 47 respectively indicate a chip-enabled state and a write-disabled state. For example, when the write protection bit set corresponding to the sector including the address output from the flash access timing controller 40 is '0', the flash protection control section 60 may determine that the access address is a write protection target address.

When the access address is a write protection target address, the flash protection control section 60 performs the write protection process (step S240). The write protection process may be implemented by converting the write address into an address where the protection bit is stored, and converting the write data into the information stored in the protection bit (i.e., the address and the data are replaced by another address and another piece of data). For example, the flash protection control section 60 may transfer the address where the protection bit is stored and the protection bit to the address/data conversion section 50, and the address/data conversion section 50 may convert the write address into the address where the protection bit is stored and convert the write data into the information stored in the protection bit.

When the access address is not a protection target address, the write command is executed (step S250).

Figure 9:
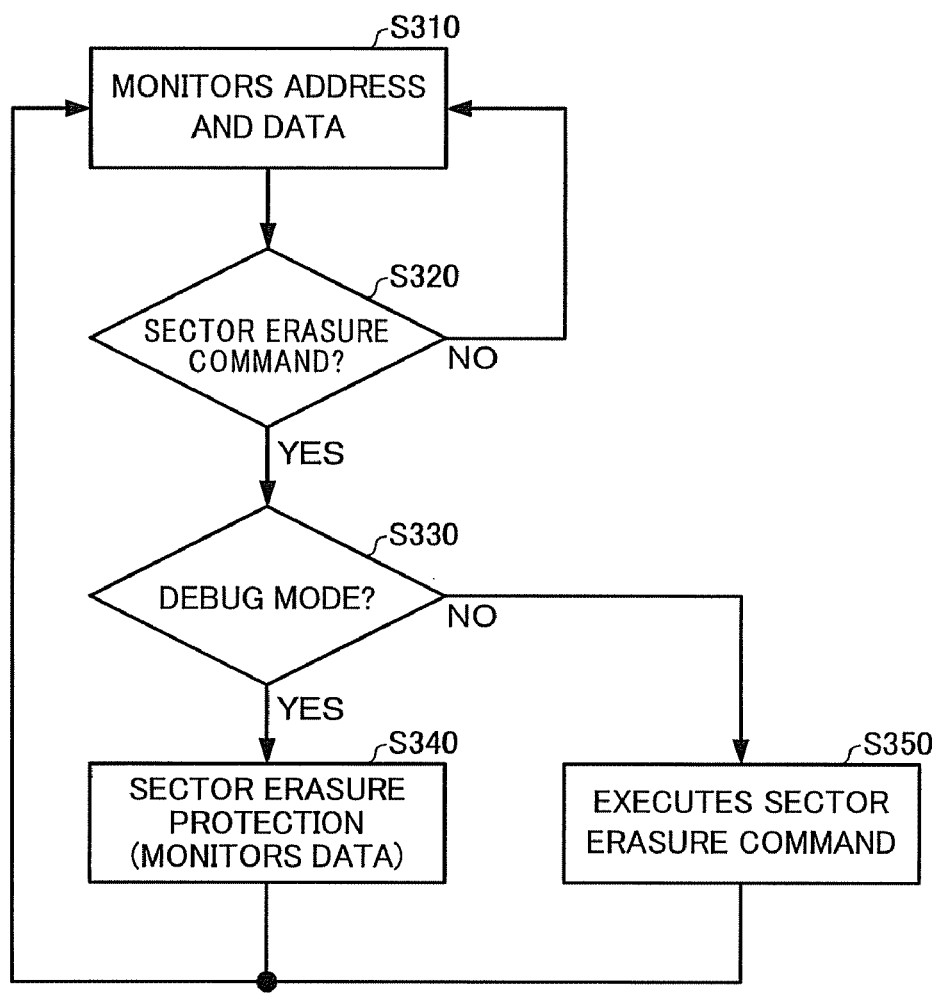
FIG. 9 is a flowchart showing the flow of a sector erasure protection process according to one embodiment of the invention.

FIG. 9 is a flowchart showing the flow of a sector erasure protection process according to this embodiment. The sector erasure command is a command which erases (initializes) data in sector units.

The flash protection control section 60 monitors the access address and data relating to the flash memory during normal operation (step S310). For example, the flash protection control section 60 may monitor the address 43, the write data 44, the chip enable signal 46, and the write enable signal 47 output from the flash access timing generation section, as shown in FIG. 1.

When the flash protection control section 60 has detected the sector erasure command, the flash protection control section 60 performs the sector erasure protection process when the operation mode is the debug mode (steps S330 and S340), and executes the sector erasure command when the operation mode is not the debug mode (steps S330 and S350). The flash protection control section 60 determines whether or not the command is the sector erasure command based on the chip enable signal 46, the write enable signal 47, and the write data 44 output from the flash access timing generation section 40. For example, the flash protection control section 60 may determine that the command is the sector erasure command when the chip enable signal 46 and the write enable signal 47 respectively indicate a chip-enabled state and a write-disabled state and the write data 44 indicates a specific value. The sector erasure protection process may be implemented by replacing the value of the data signal transmitted to the flash memory by another value to change the command into an invalid command.

Figure 10:
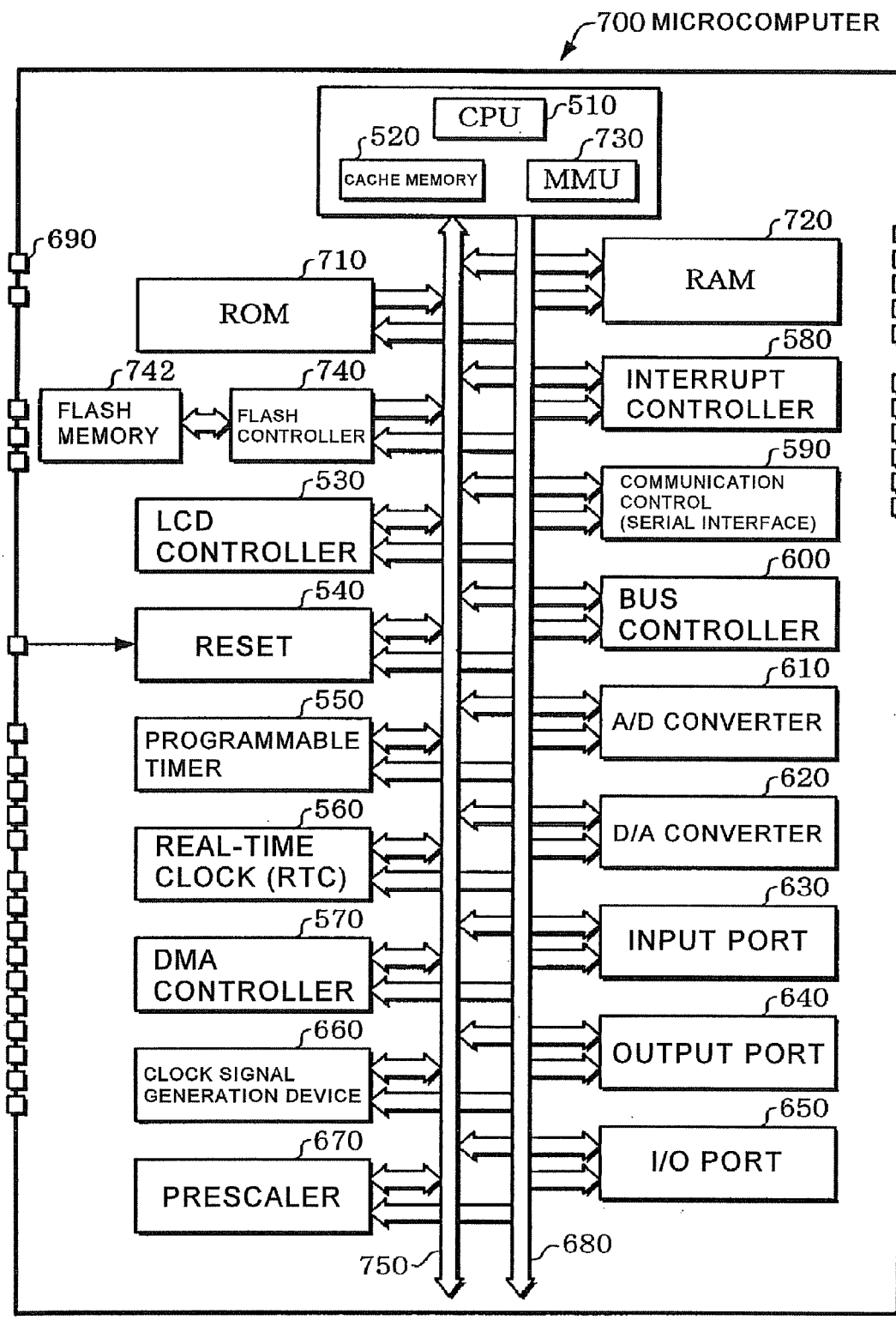
FIG. 10 is a hardware block diagram of a microcomputer according to one embodiment of the invention.

FIG. 10 shows an example of a hardware block diagram of a microcomputer according to this embodiment.

A microcomputer 700 includes a CPU 510, a cache memory 520, an LCD controller 530, a reset circuit 540, a programmable timer 550, a real-time clock (RTC) 560, a DRAM controller/bus I/F 570, an interrupt controller 580, a serial interface 590, a bus controller 600, an A/D converter 610, a D/A converter 620, an input port 630, an output port 640, an I/O port 650, a clock signal generation device 560, a prescaler 570, a flash controller 740, a flash memory 742, a general-purpose bus 680 and a dedicated bus 750 which connect these sections, various pins 690, and the like.

The flash controller 740 and the flash memory 742 have the configurations described with reference to FIGS. 1 to 9, for example.

2. Electronic instrument

Figure 11:
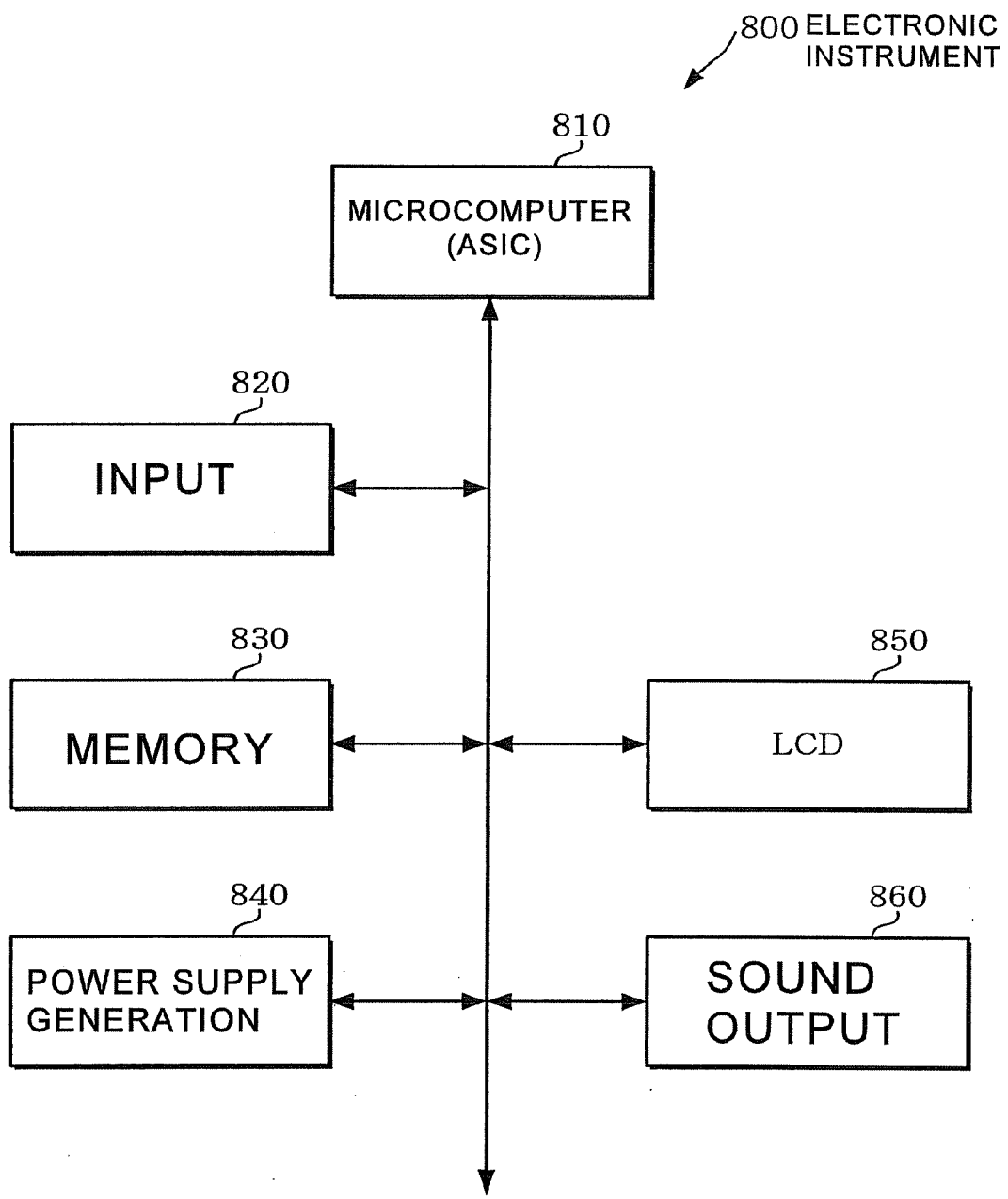
FIG. 11 shows an example of a block diagram of an electronic instrument including a microcomputer.

FIG. 11 shows an example of a block diagram of an electronic instrument according to one embodiment of the invention. An electronic instrument 800 includes a microcomputer (or ASIC) 810, an input section 820, a memory 830, a power generation section 840, an LCD 850, and a sound output section 860.

The input section 820 is used to input various types of data. The microcomputer 810 performs various processes based on data input using the input section 820. The memory 830 functions as a work area for the microcomputer 810 and the like. The power supply generation section 840 generates various power supply voltages used in the electronic instrument 800. The LCD 850 is used to output various images (e.g. character, icon, and graphic) displayed by the electronic instrument. The sound output section 860 is used to output various types of sound (e.g. voice and game sound) output from the electronic instrument 800. The function of the sound output section 860 may be implemented by hardware such as a speaker.

Figure 12A:
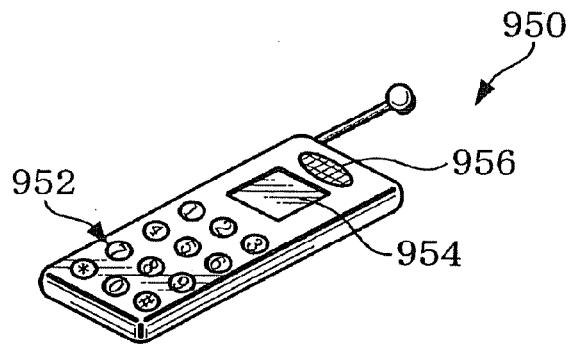
FIGS. 12A to 12C show examples of outside views of various electronic instruments.

FIG. 12A shows an example of an outside view of a portable telephone 950 which is one type of electronic instrument. The portable telephone 950 includes dial buttons 952 which function as the input section, an LCD 954 which displays a telephone number, a name, an icon, and the like, and a speaker 956 which functions as the sound output section and outputs voice.

Figure 12B:
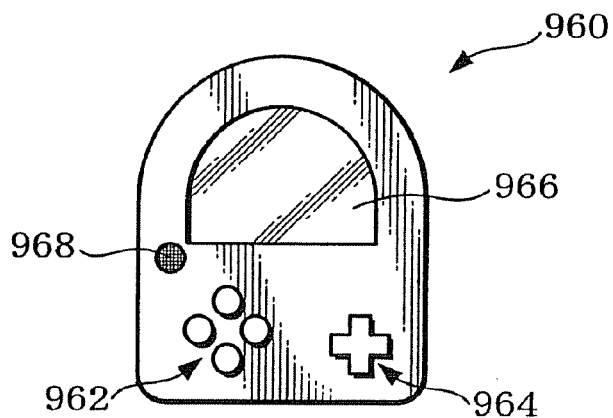

FIG. 12B shows an example of an outside view of a portable game device 960 which is one type of electronic instrument. The portable game device 960 includes operation buttons 962 which function as the input section, an arrow key 964, an LCD 966 which displays a game image, and a speaker 968 which functions as the sound output section and outputs game sound.

Figure 12C:
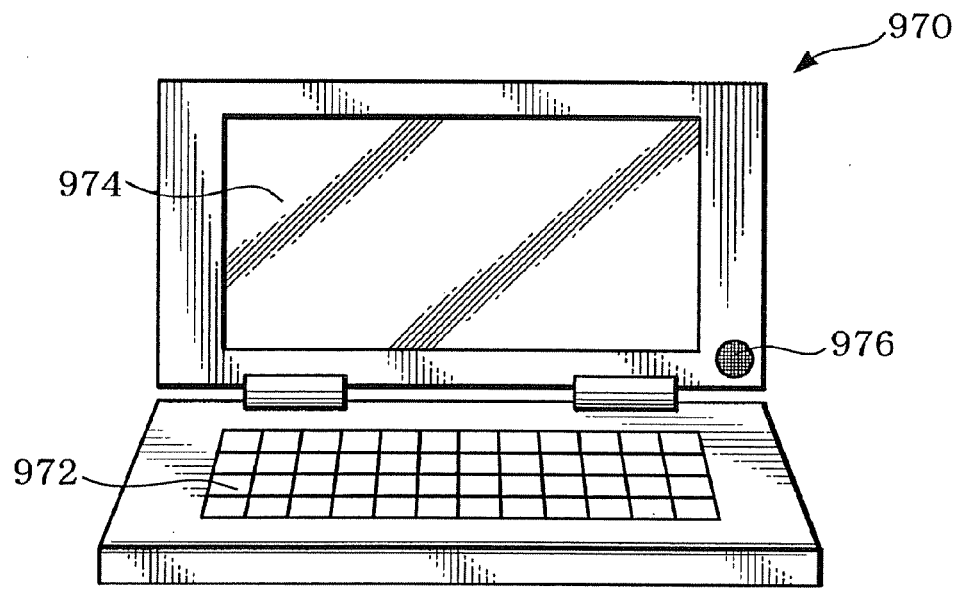

FIG. 12C shows an example of an outside view of a personal computer 970 which is one type of electronic instrument. The personal computer 970 includes a keyboard 972 which functions as the input section, an LCD 974 which displays a character, a figure, a graphic, and the like, and a sound output section 976.

A highly cost-effective electronic instrument with low power consumption can be provided by incorporating the microcomputer according to the above embodiment in the electronic instruments shown in FIGS. 12A to 12C.

As examples of the electronic instrument to which the above embodiment can be applied, various electronic instruments using an LCD such as a personal digital assistant, a pager, an electronic desk calculator, a device provided with a touch panel, a projector, a word processor, a viewfinder or direct-viewfinder video tape recorder, and a car navigation system can be given in addition to the electronic instruments shown in FIGS. 12A, 12B, and 12C.

The invention is not limited to the above-described embodiments, and various modifications can be made within the scope of the invention.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A microcomputer comprising:
    a flash memory including a protection information storage section that stores protection information, the protection information indicating whether or not access to a given area of the flash memory is available;
    a flash controller that controls access to the flash memory; and
    an arbiter that is connected to a plurality of buses including a data bus and an instruction bus, the arbiter arbitrating between the plurality of buses and allowing one of the plurality of buses to access the flash memory, the arbiter generating bus identification information that identifies whether the allowed bus is the data bus or the instruction bus, and transmitting the bus identification information to the flash protection section,
    the flash controller including a flash protection section that performs a protection process relating to access to the given area of the flash memory based on the protection information and the bus identification information, and
    the flash protection section determining whether or not a read access is an instruction read access based on the bus identification information, performing the protection process when the read access is not the instruction read access, and performing access to the given area without the protection process when the read access is the instruction read access.

2. The microcomputer as defined in claim 1,
    the protection information storage section storing protection presence information that indicates the presence or absence of at least one of read protection and write protection corresponding to each of a plurality of areas set in the flash memory; and
    the flash protection section performing the protection process based on the protection presence information corresponding to an area to which an address specified by an access request belongs.

3. The microcomputer as defined in claim 1, further comprising:
    an initialization section that reads information stored in the protection information storage section of the flash memory during a boot process, and stores the read information in a protection bit register, the flash protection section performing the protection process referring to protection information stored in the protection bit register.

4. The microcomputer as defined in claim 1,
the flash protection section performing the protection process only when an access request for the flash memory is a read request.

5. The microcomputer as defined in claim 1,
the flash protection section performing the protection process when a processing mode of a CPU is a debug mode.

6. The microcomputer as defined in claim 5,
when an access request for the flash memory is an erase request command for a predetermined block unit, the flash protection section prohibiting execution of the erase request command.

7. The microcomputer as defined in claim 1,
the flash protection section not performing the protection process when an access request for the flash memory is an erase request command for the entire flash memory.

8. The microcomputer as defined in claim 1,
the flash memory being configured so that data can be written into the flash memory after erasing a predetermined block unit in advance; and the flash protection section performing the protection process when a value stored in the protection information storage section of the flash memory differs from an initial value of a memory cell after erasure.

9. An electronic instrument comprising:
the microcomputer as defined in claim 1;
a receiving section that receives input information; and
an output section that outputs a processing result of the microcomputer based on the input information.

10. A protection method for a flash memory provided in a microcomputer, the method comprising:
a protection information setting step of providing a protection information storage section in the flash memory, the protection information storage section storing protection information that indicates whether or not access to a given area of the flash memory is available;

an arbitrating step of connecting an arbiter to a plurality of buses including a data bus and an instruction bus and permitting the plurality of buses to compete for access to the flash memory, the arbiter arbitrating between the plurality of buses and allowing one of the plurality of buses to access the flash memory, the arbiter generating and transmitting bus identification information that identifies whether the allowed bus is the data bus or the instruction bus; and a flash protection step of determining whether or not a read access is an instruction read access based on the bus identification information, performing a protection process when read access is not the instruction read access, and performing access to the given area without the protection process when the read access is the instruction read access so that access to the given area of the flash memory is performed based on the protection information and the bus identification information.

11. The protection method for a flash memory as defined in claim 10,
wherein protection presence information that indicates the presence or absence of at least one of read protection and write protection corresponding to each of a plurality of areas set in the flash memory is stored in the protection information storage section in the protection information setting step; and wherein the protection process is performed based on the protection presence information corresponding to an area to which an address specified by an access request belongs in the flash protection step.

12. The protection method for a flash memory as defined in claim 10, further comprising:
an initialization step of reading information stored in the protection information storage section of the flash memory during a boot process and storing the read information in a protection bit register, wherein the protection process is performed referring to protection information stored in the protection bit register in the flash protection step.

13. The protection method for a flash memory as defined in claim 10,
wherein the protection process is performed only when an access request for the flash memory is a read request in the flash protection step.

14. The protection method for a flash memory as defined in claim 10,
wherein the protection process is performed when a processing mode of a CPU is a debug mode in the flash protection step.

15. The protection method for a flash memory as defined in claim 14,
wherein, when an access request for the flash memory is an erase request command for a predetermined block unit, execution of the erase request command is prohibited in the flash protection step.

16. The protection method for a flash memory as defined in claim 10,
wherein the protection process is not performed when an access request for the flash memory is an erase request command for the entire flash memory in the flash protection step.

17. The protection method for a flash memory as defined in claim 10,
wherein the flash memory is configured so that data can be written into the flash memory after erasing a predetermined block unit in advance; and wherein the protection process is performed when a value stored in the protection information storage section of the flash memory differs from an initial value of a memory cell after erasure in the flash protection step.

* * * * *